July 6, 1926.
E. W. DAVIS
1,591,160
LUBRICATING SYSTEM
Filed July 16, 1925
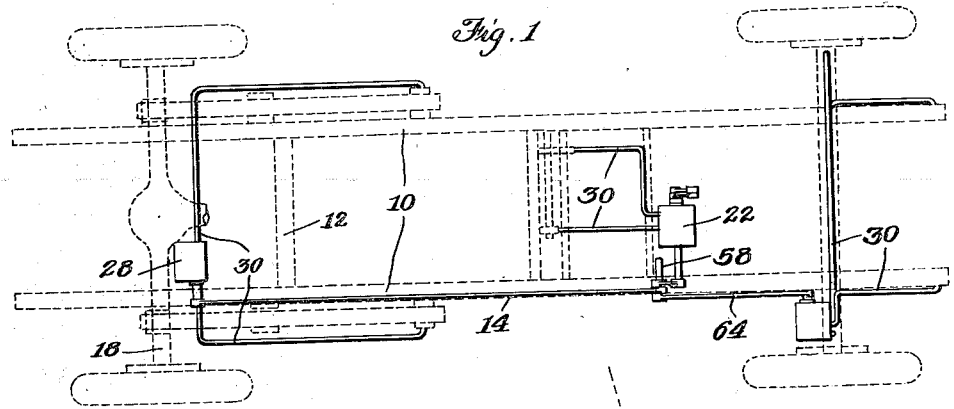
Fig. 1
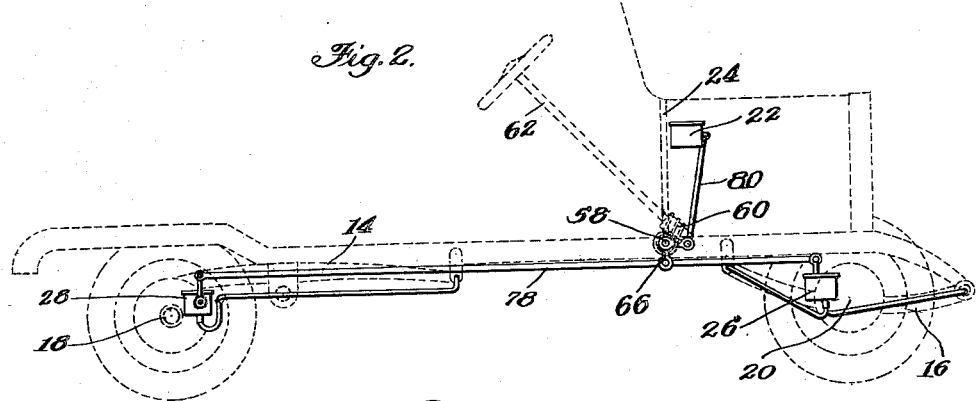
Fig. 2
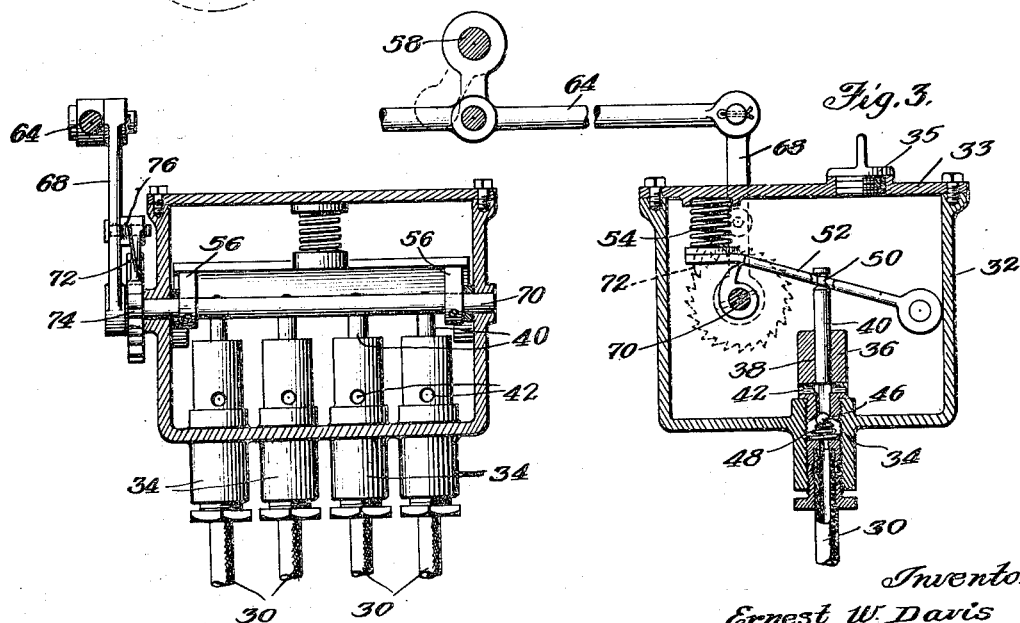
Fig. 3
Fig. 4
Inventor
Ernest W. Davis
By Pierce and Sweet
Attys.

Patented July 6, 1926.

1,591,160

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed July 16, 1925. Serial No. 43,990.

My invention relates to improvements in lubricating systems, and more particularly to a novel type of lubricating system for lubricating the chassis bearings of automotive vehicles.

At the present time, several different types of systems are in use, among which is the so-called centralized type. In some systems of this type, a single pump supplies lubricant to all the chassis bearings through individual conduits, with means either in the pump or at the ends of the conduits for determining the amount of lubricant fed to each bearing upon each operation.

In another system of this type, a single conduit passes by a plurality of bearings, and branches lead from the single conduit to each individual bearing. In this case it is imperative to locate the apportioning means adjacent each bearing.

The system employing individual conduits is objectionable on account of the length of the conduits and the difficulty and expense of installing them and keeping them in condition, and the branched conduit system has been found more or less unreliable.

The objects of the present invention are:

First, to eliminate the excessive amount of conduit involved in the individual conduit system, and at the same time avoid the inaccuracies of the branched conduit system. I accomplish this primarily by subdividing the pumping means into several units, each supplying a plurality of bearings in the same portion of the chassis, so that the conduits are much shortened, without making the number of the pumping units excessive.

Second, to lubricate the steering gear of a motor vehicle as a function of its use.

Third, to accomplish lubrication as a function of the operation of a manually controlled element without imposing any perceptible load on said controlled element at any time.

Further objects and advantages of the invention will become apparent as the description proceeds.

In the accompanying drawings:

Figure 1 is a more or less diagrammatic plan view of a lubricating system according to the invention, indicating the application thereof to a conventional motor vehicle shown in dotted lines.

Figure 2 is a side elevational view of the showing of Figure 1.

Figure 3 is a sectional view of one of the pump units, and part of the transmission for actuating the same.

Figure 4 is a section of the same parts taken at right angles to that of Figure 3.

In the embodiment of the invention selected for illustration, the motor vehicle to which the system has been applied comprises the usual frame made up of side members 10 united by a plurality of cross braces 12. Rear springs 14 and front springs 16 support the frame on the rear axle 18 and front axle 20. The pumping means is subdivided into a plurality of units, in this instance three, a body unit 22, preferably mounted on the dash board 24, a front axle unit 26 and a rear axle unit 28. From each of these units a plurality of lubricant conduits 30 extend to the bearings that can most conveniently receive lubrication from that particular unit.

Referring now to Figures 3 and 4, each unit comprises a lubricant receptacle 32 provided with a suitable cover 33 having a filling opening and plug 35, the whole functioning also as a housing for the pumping mechanism. A plurality of vertical exit bosses 34 are formed in the bottom of the receptacle 32. A cylinder body 36 is threaded into the upper end of each boss 34, and has a vertical bore 38 receiving plunger 40, and a horizontal bore 42 forming inlet ports for the lubricant.

A discharge conduit 30 is mounted in the lower end of each boss, and between the conduit and the cylinder body I provide a check valve 46 held in place by a spring 48.

Each plunger 40 has a reduced portion 50 passing through an aperture in a rocker plate 52, the apertures being suitably enlarged to allow for the lateral movement of the rocker plate during its rotation.

For actuating the rocker plate, I provide a compression spring 54 pushing down on the same at the center, and a pair of cams 56 at the corner, for lifting the plate slowly and then suddenly releasing it to move down under the force of the spring and deliver a charge of lubricant to the bearings.

To actuate cams 56 I have illustrated a shaft 58 prolonging the transverse pintle of the steering arm, which is driven by the worm 60 on the steering column 62. A forwardly extending link 64 pivoted to an arm 66 on shaft 68 is pivoted at its front end to a vertical arm 68 rotatable on the shaft 70 carrying cams 56. A pawl 72 mounted on the arm 68 engages a ratchet 74 keyed to shaft 70, being held in contact with the teeth by a suitable spring 76. It will be obvious that upon any movement of the steering gear beyond a predetermined limit, arm 68 will rotate sufficiently to move the pawl 72 in one direction, or the other, through a greater displacement than one ratchet tooth and that successive movements will rotate shaft 70 step by step always in one direction. During each rotation of shaft 70, cams 56 will first slowly raise plate 52, and then release it to move down suddenly under the pressure of spring 54.

Similarly, connections for actuating the other pumping unit include a rearwardly extending link 78 for the rear axle unit, and an upwardly extending link 80 for the body unit 22.

Without further elaboration, the foregoing will so fully explain the gist of my invention, that others may, by applying current knowledge, readily adapt the same for use under various conditions of service. It will, for instance, be obvious that where either the load imposed on the manual actuating means, or the frequency of lubricating, is too great with a direct drive as indicated in Figure 4 reduction gearing may readily be interpolated between the ratchet 74 and the shaft carrying cams 56, to reduce to any desired degree both the load on the actuating means and the frequency of lubrication. This and many other modifications and adaptations may readily be made by those skilled in the art, without eliminating certain features which may properly be said to constitute the essental items of novelty involved, which items are intended to be defined and secured to me by the following claims.

I claim:

1. The combination with an automotive vehicle chassis comprising a front axle construction and a steering gear mechanism, of means for lubricating bearings of said chassis comprising a pump, a plurality of conduits extending from said pump to the bearings to be lubricated, and means actuated by any movement of said steering gear mechanism for operating said pump, said means including a ratchet mechanism whereby a plurality of movements of said steering gear mechanism are required for producing a single operation of said pump.

2. The combination with an automotive vehicle chassis comprising a front axle mechanism, a steering gear mechanism connected with said front axle construction, a pump for supplying lubricant to various bearings on said chassis and means for withdrawing and storing energy from all movements of said steering gear mechanism for effecting a single operation of said pump.

3. The combination with a motor vehicle having a frame and front and rear axles, three lubricating devices, one for the front axle and associated parts, one for the rear axle and associated parts, and one for the frame and associated parts, a steering gear, and an individual transmission from said steering gear to each of said devices.

4. The combination with a motor vehicle having a frame and front and rear axles, three lubricating devices, one for the front axle and associated parts, one for the rear axle and associated parts, and one for the frame and associated parts, a manual control element, and an individual transmission from said manual control element to each of said devices.

In witness whereof, I hereunto subscribe my name this 11th day of July, 1925.

ERNEST W. DAVIS.